United States Patent
Stolfo et al.

(10) Patent No.: US 7,657,935 B2
(45) Date of Patent: Feb. 2, 2010

(54) SYSTEM AND METHODS FOR DETECTING MALICIOUS EMAIL TRANSMISSION

(75) Inventors: Salvatore J. Stolfo, Ridgewood, NJ (US); Eleazar Eskin, Santa Monica, CA (US); Shlomo Herskop, Brooklyn, NY (US); Manasi Bhattacharyya, Flushing, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 875 days.

(21) Appl. No.: 10/222,632

(22) Filed: Aug. 16, 2002

(65) Prior Publication Data

US 2003/0167402 A1 Sep. 4, 2003

Related U.S. Application Data

(60) Provisional application No. 60/340,197, filed on Dec. 14, 2001, provisional application No. 60/312,703, filed on Aug. 16, 2001.

(51) Int. Cl.
*G06F 11/00* (2006.01)
*G06F 12/14* (2006.01)
(52) U.S. Cl. .............. 726/22; 726/23; 726/25; 726/24; 709/206; 709/223; 709/225
(58) Field of Classification Search .......... 726/23–24, 726/22, 26; 713/201; 709/206–208
See application file for complete search history.

(56) References Cited

U.S. PATENT DOCUMENTS

| | | | |
|---|---|---|---|
| 6,161,130 A * | 12/2000 | Horvitz et al. | 709/206 |
| 6,434,745 B1 * | 8/2002 | Conley et al. | 717/177 |
| 6,708,212 B2 * | 3/2004 | Porras et al. | 709/224 |
| 6,769,067 B1 * | 7/2004 | Soong | 726/2 |
| 6,778,995 B1 | 8/2004 | Gallivan | |
| 6,820,081 B1 | 11/2004 | Kawai et al. | |
| 6,888,548 B1 | 5/2005 | Gallivan | |

(Continued)

OTHER PUBLICATIONS

Probabilistic Techniques for Intrusion Detection Based on Computer Audit Data, Nong et al, vol. 31,No. 4,Jul. 2001 pp. 266-274, IEEE.*

(Continued)

*Primary Examiner*—Nasser G Moazzami
*Assistant Examiner*—Fikremariam Yalew
(74) *Attorney, Agent, or Firm*—Baker Botts LLP

(57) ABSTRACT

A system and methods of detecting an occurrence of a violation of an email security policy of a computer system. A model relating to the transmission of prior emails through the computer system is defined which is derived from statistics relating to the prior emails. For selected emails to be analyzed, statistics concerning the selected email are gathered. Such statistics may refer to the behavior or other features of the selected emails, attachments to emails, or email accounts. The determination of whether a violation of an email security policy has occurred is performed by applying the model of prior email transmission to the statistics relating to the selected email. The model may be statistical or probabilistic. A model of prior email transmission may include grouping email recipients into cliques. A determination of a violation of a security policy may occur if email recipients for a particular email are in more than one clique.

54 Claims, 9 Drawing Sheets

U.S. PATENT DOCUMENTS

| | | | |
|---|---|---|---|
| 6,901,398 B1* | 5/2005 | Horvitz et al. | 707/5 |
| 6,904,168 B1* | 6/2005 | Steinberg et al. | 382/165 |
| 6,931,433 B1* | 8/2005 | Ralston et al. | 709/206 |
| 6,978,274 B1 | 12/2005 | Gallivan et al. | |
| 7,035,876 B2 | 4/2006 | Kawai et al. | |
| 7,080,076 B1 | 7/2006 | Williamson et al. | |
| 7,092,992 B1* | 8/2006 | Yu | 709/206 |
| 2002/0059418 A1* | 5/2002 | Bird et al. | 709/224 |
| 2003/0097409 A1* | 5/2003 | Tsai | 709/206 |

OTHER PUBLICATIONS

An Application of Machine Learning to Anomaly Detection, Terran et al, Feb. 14, 1997.*

An Intelligent Decision Support System for Intrusion Detection and Response, Dipankar et al, Publisher Springer-Verlag, May 21-23, 2001,St.Petersburg,Russia.*

Nong et al(Probablistic Techniques for Intrusion Detection Based on Computer Audit data Published Jul. 2001).*

Kin C. Bron and J. Kerbosch. "Algorithm 457: Finding All Cliques of an Undirected Graph," *Communications of ACM*, 16:575-577, 1973.

Kephart, Chess, and White. "Computers and Epidemiology," IBM Watson Research Center, 1993, pp. 1-20 (as available on-line).

Eleazar Eskin et al. "System and Method for Intrusion Detection with Dynamic Window Sizes," filed Jul. 30, 2000, U.S. Appl. No. 10/208,402.

Matthew Schulz et al. "System and Method For Detection Of New Malicious Executables," filed Jul. 30, 2000, U.S. Appl. No. 10/208,432.

Bhattacharyya M et al., 2002, "MET: An Experimental System for Malicious Email Tracking" *Proceedings 2002 New Security Paradigms Workshop*.

Schultz MG et al., Jun. 2001, "Mef: Malicious email filter—a unix mail filter that detects malicious windows executables" http://www.cs.columbia.edu/ids/mef/rel_$_{papers.html}$, *USENIX Annual Technical Conference*.

Schultz MG et al., May 2001, "Data mining methods for detection of new malicious executables" *Proceedings of the IEEE Symposium on Security and Privacy*.

Wang C et al., 2000, "On computer viral infection and the effect of immunization" *Proceedings of the 16th ACM Annual Computer Applications Conference*.

White SR et al., 1999, "Anatomy of a Commercial-Grade Immune System" *IBM Research White paper*, http://www.av.ibm.com/ScientificPapers/White/Anatomy/anatomy.html, pp. 1-28.

White SR, Oct. 1998, "Open problems in computer virus research" *Online publication*, http://www.research.ibm.com/antivirus/SciPapers/White/Problems, *Virus Bulletin Conference*, pp. 1-11.

Kohavi R, 1995, "A study of cross-validation and bootstrap for accuracy estimation and model selection" *International Joint Conference on Artificial Intelligence (IJCAI)*.

Feng C et al., 1994, "Machine Learning of Rules and Trees" *Machine Learning, Neutral and Statistical Classification*, pp. 50-83.

W.O. International, 1993-2003, "PC Viruses in the Wild" http://www.bocklabs.wisc.edu/janda/wildlist.html, pp. 1-15.

Kephart JO, 1994, "A biologically inspired immune system for computers" *Artificial Life IV*, R. Brooks and P. Maes, eds., pp. 1-10.

Rivest RL, 1992, "The MD5 message digest algorithm" *MIT Laboratory for Computer Science and RSA Data Security, Inc.*, http://www.ietf.organization/rfc/rfc1321.txt, pp. 1-20.

* cited by examiner

SYSTEM AND METHODS FOR DETECTING MALICIOUS EMAIL TRANSMISSION

CLAIM FOR PRIORITY TO RELATED APPLICATIONS

This application claims the benefit of U.S. Provisional Patent Application Ser. No. 60/340,197, filed on Dec. 14, 2001, entitled "System for Monitoring and Tracking the Spread of Malicious E-mails," and U.S. Provisional Patent Application Ser. No. 60/312,703, filed Aug. 16, 2001, entitled "Data Mining-Based Intrusion Detection System," which are hereby incorporated by reference in their entirety herein.

STATEMENT OF GOVERNMENT RIGHT

The present invention was made in part with support from United States Defense Advanced Research Projects Agency (DARPA), grant no. F30602-00-1-0603. Accordingly, the United States Government may have certain rights to this invention.

COMPUTER PROGRAM LISTING

A computer program listing is submitted in duplicate on CD. Each CD contains a routine Clique_finder, which CD was created on Aug. 15, 2002, and which is 16.8 kB in size. The files on this CD are incorporated by reference in their entirety herein.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to systems and methods for detecting violations of an email security policy in a computer system, and more particularly to the use of probabilistic and statistical models to model the behavior of email transmission through the computer system.

2. Background

Computer systems are constantly under attack by a number of malicious intrusions. For example, malicious software is frequently attached to email. According to NUA Research, email is responsible for the spread of 80 percent of computer virus infections (Postini Corporation, Press release "Postini and Trend Micro Partner to Offer Leading Virus Protection Via Postini's Email Pre-processing Infrastructure," Online Publication, 2000. http://www.postini.com/company/pr/pr100200.html.) Various estimates place the cost of damage to computer systems by malicious email attachments in the range of 10-15 billion dollars in a single year. Many commercial systems have been developed in an attempt to detect and prevent these attacks. The most popular approach to defend against malicious software is through anti-virus scanners such as Symantec and McAfee, as well as server-based filters that filters email with executable attachments or embedded macros in documents (Symantec Corporation, 20330 Stevens Creek Boulevard, Cupertino, Calif. 95014, Symantec worldwide home page, Online Publication, 2002. http://www.symantec.com/product, and McAfee.com Corporation, 535 Oakmead Parkway, Sunnyvale, Calif. 94085, Macafee home page. Online Publication, 2002. http://www.mcafee.com).

These approaches have been successful in protecting computers against known malicious programs by employing signature-based methods. However, they do not provide a means of protecting against newly launched (unknown) viruses, nor do they assist in providing information that my help trace those individuals responsible for creating viruses. Only recently have there been approaches to detect new or unknown malicious software by analyzing the payload of an attachment. The methods used include heuristics, (as described in Steve R. White, "Open problems in computer virus research," Online publication, http://www.research.ibm.com/antivirus/SciPapers/White/Problems/Problems.html), neural networks (as described in Jeffrey O. Kephart, "A biologically inspired immune system for computers," *Artificial Life IV, Proceedings of the Fourth International Workshop on Synthesis and Simulatoin of Living Systems*, Rodney A. Brooks and Pattie Maes, eds. pages 130-193, 1994), and data mining techniques (as described in Matthew G. Schultz, Eleazar Eskin, Erez Zadok, and Salvatore J. Stolfo, "Data Mining Methods For Detection Of New Malicious Executables," *Proceedings of the IEEE Symposium on Security and Privacy*, Oakland, Calif., May 2001, and Salvator J. Stolfo, Erez Zadok, Manasi Bhattacharyya, Matthew G. Schultz, and Eleazar Eskin "MEF: Malicious Email Filter: a Unix Mail Filter That Detects Malicious Windows Executables," Online publications, http://www.cs.columbia.edu/ids/mef/rel papers.html). An email filter which detects malicious executables is described in Schultz et al. U.S. patent application Ser. No. 10/208,432, filed Jul. 30, 2002, entitled "System and Methods for Detection of New Malicious Executables," which is incorporated by reference in its entirety herein.

In recent years however, not only have computer viruses increased dramatically in number and begun to appear in new and more complex forms, but the increased inter-connectivity of computers has exacerbated the problem by providing the means of fast viral propagation.

Moreover, violations in email security policies have occurred which are marked by unusual behaviors of emails or attachments. For example, spam is a major concern on the internet. More than simply an annoyance, it costs corporations many millions of dollars in revenue because spam consumes enormous bandwidth and mail server resources. Spam is typically not detected by methods that detect malicious attachments, as described above, because spam typically does not include attachments.

Other email security violations may occur where confidential information is being transmitted by an email account to at least one improper addressee. As with spam, such activity is difficult to detect where no known viruses are attached to such emails.

Accordingly, there exists a need in the art for a technique to detect violations in email security policies which can detect unauthorized uses of email on a computer system and halt or limit the spread of such unauthorized uses.

SUMMARY

An object of the present invention is to provide a technique for detecting violations of email security policies of a computer system by gathering statistics about email transmission through a computer system.

Another object of the present invention is to provide a technique for modeling the behavior of attachments and/or modeling of the behavior of email accounts on a computer system.

A further object of the present invention is to provide a technique for generating and comparing profiles of normal or baseline email behavior for an email account and for selected email behavior and for determining the difference between such profiles, and whether such difference represents a violation of email security policy.

A still further object of the invention is to protect the identity of email account users, while tracking email behavior associated with such users.

These and other objects of the invention, which will become apparent with reference to the disclosure herein, are accomplished by a system and methods for detecting an occurrence of a violation of an email security policy of a computer system by transmission of selected email through the computer system. The computer system may comprise a server and one or more clients having an email account. The method comprises the step of defining a model relating to prior transmission of email through the computer system derived from statistics relating to the prior emails, and the model is saved in a database. The model may be probabilistic or statistical. Statistics may be gathered relating to the transmission of the selected email through the computer system. The selected email may be subsequently classified as violative of the email security policy based on applying the model to the statistics.

In a preferred embodiment, the step of defining a model comprises defining a model relating to attachments to the prior emails transmitted through the computer system. Such model may created by using a Naive Bayes model trained on features of the attachment. New attachments are extracted from each of the new emails transmitted through the computer system. The attachment may be identified with a unique identifier. According to this embodiment, the step of gathering statistics relating to the transmission of new email through the computer system comprises recording the number of occurrences of the attachment received by the client.

The step of gathering statistics relating to the transmission of new email through the computer system may comprise, for each attachment that is transmitted by an email account, recording a total number of addresses to which the attachment is transmitted. This step may also include recording a total number of email accounts which transmit the attachment. In addition, this step may include, for each attachment that is transmitted by an email account, defining a model that estimates the probability that an attachment violates an email security policy based on the total number of email addresses to which the attachment is transmitted and the total number of email accounts which transmit the attachment.

The step of classifying the email may be performed at the client. Alternatively or in addition, the step of classifying the email may be performed at the server. The classification determined at the server may be transmitted to the one or more clients. In addition, the classification determined at the client may be transmitted to the server, and retransmitted to the one or more clients in the system.

According to another embodiment, the step of defining a model relating to prior transmission of email may comprise defining model derived from statistics relating to transmission of emails from one of the email accounts. A model may be derived from statistics accumulated over a predetermined time period. For example, a model may be defined relating the number of emails sent by an email account during a predetermined time period. A model may alternatively be derived from statistics accumulated irrespective of a time period. For example, a model may be derived relating to the number of email recipients to which the email account transmits an email. In an exemplary embodiment, such models are represented as histograms. The step of gathering statistics about the transmission of selected email may comprise representing such transmission of selected email as a histogram. Classifying the transmission of selected email may comprise comparing the histogram of prior email transmission with the histogram of selected email transmission. The comparison may be performed by such techniques as Mahalonobis distance, the Chi-Square test, or the Kolmogorov-Simironov test, for example.

Advantageously, the step of defining a model relating to transmission of emails from one of the email accounts may comprise defining the model based on the email addresses of recipients to which the emails are transmitted by the email account. Accordingly, the email addresses may be grouped into cliques corresponding to email addresses of recipients historically occurring in the same email. The step of gathering statistics relating to the transmission of email through the computer system may comprise, for email transmitted by the email account, gathering information on the email addresses of the recipients in each email. The email may be classified as violating the email security policy based on whether the email addresses in the email are members of more than one clique.

The step of defining a model relating to transmission of emails from one of the email accounts may comprise, for emails transmitted from the email account, defining the model based on the time in which the emails are transmitted by the email account. Alternatively, the model may be based on the size of the emails that are transmitted by the email account. As yet another alternative, the model may be based on the number of attachments that are transmitted by the email account The client may comprise a plurality of email accounts and the step of defining a model relating to prior transmission of email may comprise defining a model relating to statistics concerning emails transmitted by the plurality of email accounts. According to this embodiment, the step of defining a probabilistic model may comprise defining a model based on the number of emails transmitted by each of the email accounts. The model may also be defined based on the number of recipients in each email transmitted by each of the email accounts.

In accordance with the invention, the objects as described above have been met, and the need in the art for a technique which detects violations in an email security policy by modeling the email transmission through the computer system, has been satisfied.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 2 is a screen of the user interface, illustrating information displayed concerning emails transmitted through the system in accordance with the present invention.

Figure 1:
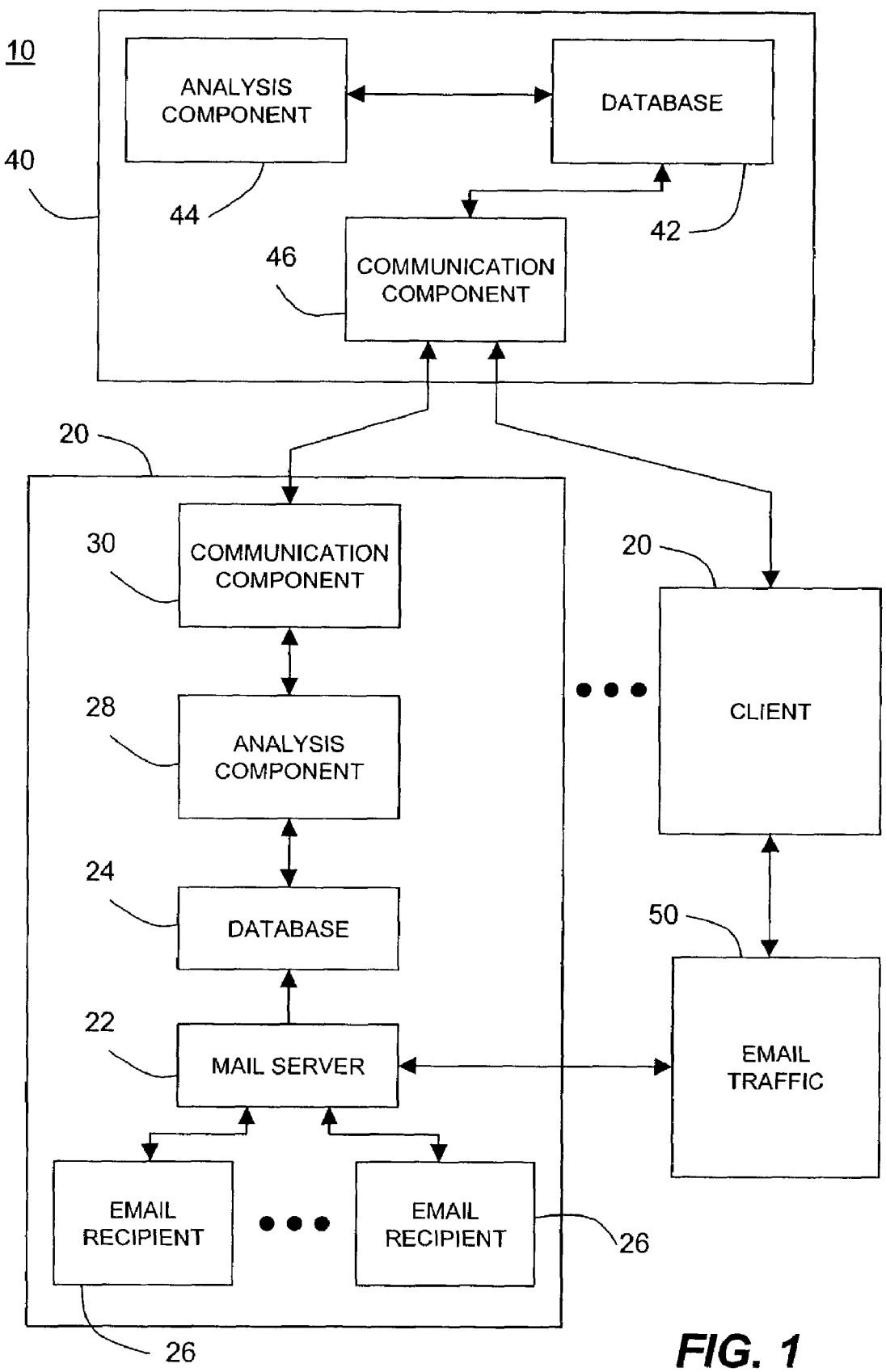
FIG. 1 is a chart illustrating a system in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF EXEMPLARY EMBODIMENTS

This invention will be further understood in view of the following detailed description.

In accordance with the invention, a system and method for a violation of an email security policy of a computer system is disclosed herein. A violation of an email security policy can be defined in several ways. Such an email security policy may be explicit or implicit, and generally refers to any activity which may be harmful to the computer system. For example, an attachment to an email which contains a virus may be considered a violation of a security policy. Attachments which contain viruses can manifest themselves in several ways, for example, by propagating and retransmitting themselves. Another violation of a security policy may be the act of emailing attachments to addresses who do not have a need to receive such attachments in the ordinary course. Alternatively, the security policy may be violated by "spam" mail, which are typically unsolicited emails that are sent to a large number of email accounts, often by accessing an address book of a host email account. The method disclosed herein detects and tracks such security violations in order to contain them.

A model is defined which models the transmission of prior email through the computer system through the computer system. The model may be statistical model or a probabilistic model. The transmission of emails "through" the system refers to emails transmitted to email accounts in the system, email transmitted by email accounts in the system, and between email accounts within the system. The system accumulates statistics relating to various aspects of email traffic flow through the computer system. According to one embodiment, the model is derived from observing the behavior or features of attachments to emails. Another embodiment concerns modeling the behavior of a particular email account. Yet another embodiment models the behavior of the several email accounts on the system to detect "bad" profiles. The model is stored on a database, which may be either at a client or at a server, or at both locations.

The selected email transmission is typically chosen for some recent time period to compare with the prior transmission of email. Each email and/or its respective attachment is identified with a unique identifier so it may be tracked through the system. Various statistics relating to the emails are gathered. The probability that some aspect of the email transmission, e.g. an attachment, an email transmission, is violative of an email security policy is estimated by applying the model based on the statistics that have been gathered. Whether the email transmission is classified as violative of the email security policy is then transmitted to the other clients.

The system 10, as illustrated in FIG. 1, has two primary components, one or more clients 20 and one or more servers 40. The client 20 is defined herein as a program integrated with an email server 22, which monitors and logs email traffic 50 for one or more email accounts 26, and which generates reports that are sent to the server 40. The client 20 may run on a separate computer from the email server 22, or on the same computer. The server 40 may run at a central location and receives reports from the client 20 in order to generate statistics and alerts about violations of email security policy which are distributed back to the clients 20.

The client 20 also includes a database 24, which stores information about all email attachments that pass through the mail server 22 to one or more email accounts 26. (Transmission of the email to the respective account may be prevented if a violation of a security policy is detected.) The system 10 contains a component to integrate with the email sever 22. In an exemplary embodiment, the client 20 is integrated with SENDMAIL using PROCMAIL. The client 20 also contains an analysis component 28 to compute the unique identifiers for attachments. The data analysis component 28 extracts statistics from the database 24 to report to the server 40. A communication component 30 handles the communication between the client 20 and the server 40.

When integrated with the mail server 22, the client 20 processes all email. Each email is logged in the database 24 along with a set of properties associated with that email including a unique reference number for that email, the sending email account, the recipient email accounts, the number of recipients, the number of attachments, if any, the time and date of the email, the size in bytes of the email body, the size in bytes of the subject line, the number and list of "keywords" in the email subject line or body, other linguistic features of the email content (which may be a wide variety of features such as the number of nouns, or noun phrases, and/or the frequency distribution of words, or the frequency distribution of n-grams, or other such linguistic features commonly known in the state of the art), as well as other recorded properties of the email (some that may be inferred by application of a probabilistic, statistical or classification model which may label the email with some category of interest).

The mail server 22 extracts attachments from the email, if any, and computes a unique identifier for each attachment. The name of the attachment or the subject of the email is typically not sufficient information for tracking because one virus may be sent under several different names and subject lines since these fields are easily alterable by the malicious software. The system computes the MD5 hash of every binary attachment received to create the unique identifier, using the hexadecimal representation of the binary as input to the algorithm. (The MD5 is known in the art, and described in R. Rivest, "The MD5 Message Digest Algorithm," *Internet RFC*1321, Paril 1992, which is incorporated by reference in its entirety herein.) (Polymorphic viruses will have different identifiers for each instance of the virus.) A probabilistic model for the attachments may be created by training a Naive Bayes model on a training set of email attachments, described in U.S. patent application Ser. No. 10/208,432, filed Jul. 30, 2002, entitled "System and Methods for Detection of New Malicious Executables," which is incorporated by reference above.

This unique identifier is used to aggregate information about the same attachment propagated in different emails. This step if most effective if payload, e.g., the content of the email, such as the body, the subject, and/or the content of the attachment, is replicated without change during virus propagation among spreading emails and thus tracking the email attachments via this identifier is possible.

The client 20 stores a record containing the identifier and other information and statistics for each email and attachment in the database 24. This information is typically transmitted to the server 40, and such information is also transmitted from the server 40 to the client 20 for information that is received from other clients 20, or where identifiers or models have been updated. By querying the database 24 with a list of the identifiers for known programs that are "malicious," e.g., that violate the security policy, the administrator can determine the points of entry of emails having such programs as attachments into a network, and can maintain a list of the senders and recipients of these emails. Even if a logged attachment was not initially acknowledged as malicious but only later categorized to be so, since a record of all attachments is stored in the database the points of entry can still be recovered.

System 10 allows the system administrator to distinguish between email traffic containing non-malicious email attachments and email traffic containing malicious software attachments. Malicious programs that self-replicate will likely propagate at a significantly different rate than regular attachments sent within the environment in which the system 10 is installed. These differences may become more apparent as all email is monitored, and (temporal) statistics are gathered carefully within that environment to establish norms for email flows, as will be described below.

The system 10 uses the information stored in the database in several ways. Since the system 10 can determine the points of entry of a malicious attachment into a network, e.g., the recipient email account 26 and/or the client 20 associated with the email account 26, this can greatly assist the cleanup associated with an email virus incident and can help the system administrator reduce and contain the associated damage.

In addition, the client 20 gathers statistics about the propagation of each malicious attachment through the site which is shared with the server 40. The system may define an attachment as malicious or benign by extracting features of the attachment, and using a probabilistic model to determine whether the attachment is malicious or benign. A procedure for classifying attachments is described in U.S. patent application Ser. No. 10/208,432, filed Jul. 30, 2002, entitled "System and Methods for Detection of New Malicious Executables," which is incorporated by reference above.

The system also may define a probabilistic or statistical model relating to the behavior of attachments derived from these statistics or features. This allows a global view of the propagation of malicious attachments and allows the system 10 to quantify the threat of these attachments as described below. Some statistics that are reported for each malicious attachment is the prevalence of an attachment and the birth rate of an attachment. The prevalence is the number of occurrences an attachment was observed by the client 20 and the birth rate is the average number of copies of the attachment which are transmitted from the same email account 26. Both of these statistics can be easily obtained from the database 24.

Self-replicating viruses naturally have extremely high birth rates. If a client 20 detects an attachment with a very high birth rate, the client 20 can warn the server 40 that this attachment is a potential self replicating virus. The server 40 can in turn warn other clients 20 about this attachment which can reduce the spread of these types of viruses.

Many self-replicating viruses have a similar method of propagation, i.e., they transmit themselves to email addresses found on the address book of the host computer. This behavior may manifest itself in an extremely high birth rate for the attachment. While in some cases a large birthrate for an attachment would be normal, such as in a broadcast message, self-replicating viruses are characterized in that the message is transmitted from multiple email accounts 26. In fact, the number of email accounts 26 that send the message depends on the number of email accounts 26 that open the attachment.

An exemplary method for detecting self-replicating viruses is to classify an attachment as self replicating if its birth rate is greater than some threshold t and the attachment is sent from at least l email accounts. If an email flow record is above the threshold t, the client 20 notifies the server 40 with the unique identifier of the attachment. The server 40 propagates the unique identifier to the clients 20 which instruct the mail server 24 to block all emails that contain an attachment with this unique identifier. In practice, these mails can be queued until a system administrator can determine whether or not they are malicious.

The server 40 runs at a central location and communicates with the clients 20 deployed at various mail servers 22. The server 40 can typically be operated by a trusted third party and various networks can make agreements with this third party to provide the services described herein.

Figure 2:
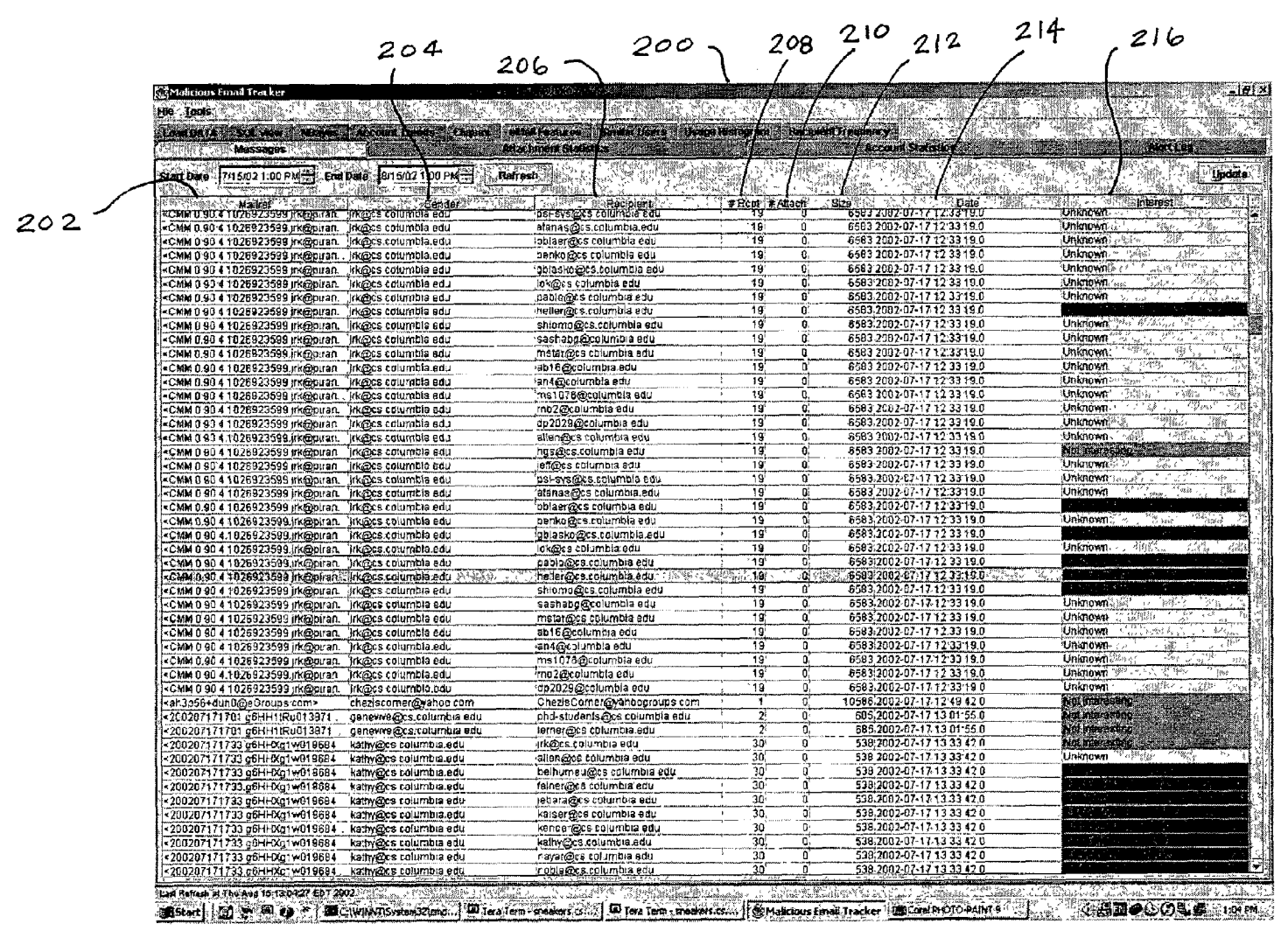
Figure 3:
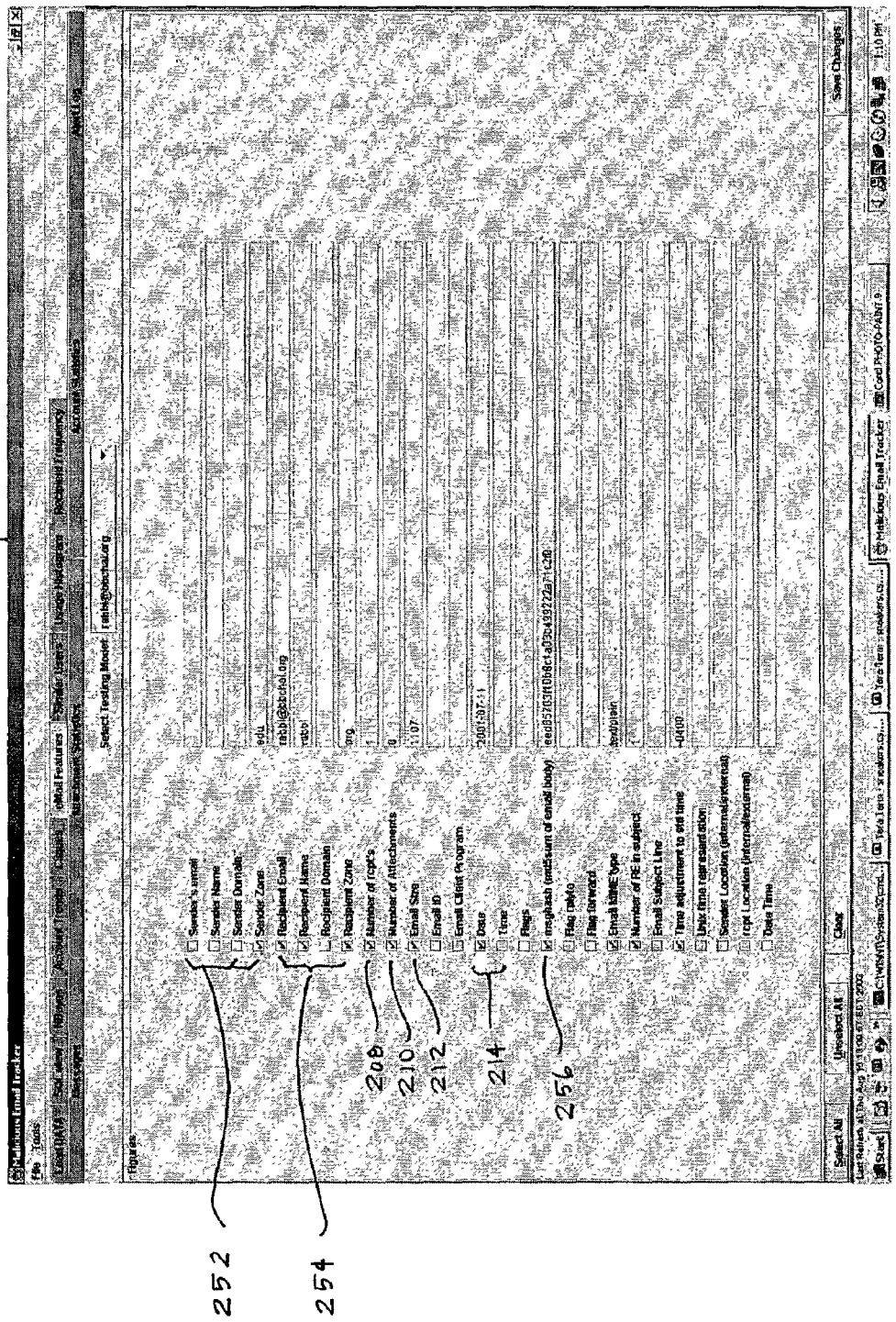
FIG. 3 is another screen of the user interface, illustrating further information displayed concerning emails transmitted through the system in accordance with the present invention.

The server 40 has several functions. The server 40 may be responsible for propagating an updated list of unique identifiers associated with known malicious viruses to the clients 20. This propagation is automated which allows for rapid update of the clients 20 immediately when a new malicious virus is discovered. The server 40 is responsible for aggregating statistics obtained from the reports from clients 20 which allows the system 10 to monitor violations of security policies at a global level. The information contained in each record is shown in FIGS. 2-3, which illustrates screens of the user interface for system 10. The fields correspond to information that the server 40 needs to either query the client 20 for more information, or to compute basic aggregate statistics.

Screen 200 (FIG. 2) displays information concerning all emails which are transmitted through the system. For each email, a reference code 202 is assigned, the sender email account 204, the recipient email account 206, and the number of recipients 208 are noted. Also indicated is the number of attachments 210, the size of the email 212, and the time and date 214 of transmission. Finally, the email is classified as "interesting" or "not interesting" or a similar category, such as malicious, benign, or borderline, as will be described in greater detail below.

Screen 250 (FIG. 3) illustrates a number of features that may be stored and displayed for each email. For example, further information on the sender 252, e.g., sender's email, sender's name, etc., and information on the recipient 254, e.g., recipient's email, recipient's name, etc., may be stored and displayed. However, it is also important in certain contexts to maintain the identify of email accounts in confidence. It is therefore important to have a de-identified user account which tracks a particular account, but which does not reveal the identity of the account. A privacy feature is accomplished in the exemplary embodiment by way of an MD5 hash algorithm, as described above, or equivalent which is applied to each email address, thereby creating a unique alphanumeric identifier 256 for the email, but which does not reveal the email address. Alternatively an alphanumeric code may be similarly created for the email address of the sender (not shown). The sender information 252 is blank in screen 250. This may of de-identifying email may be a useful feature for a security personnel working with the system who may not have authorization to know the true email addresses that may cause alerts. In such instance, a higher authority may be required to inspect any such alerts and would have access to the mapping from the real email address to the unique identifier.

Figure 4:
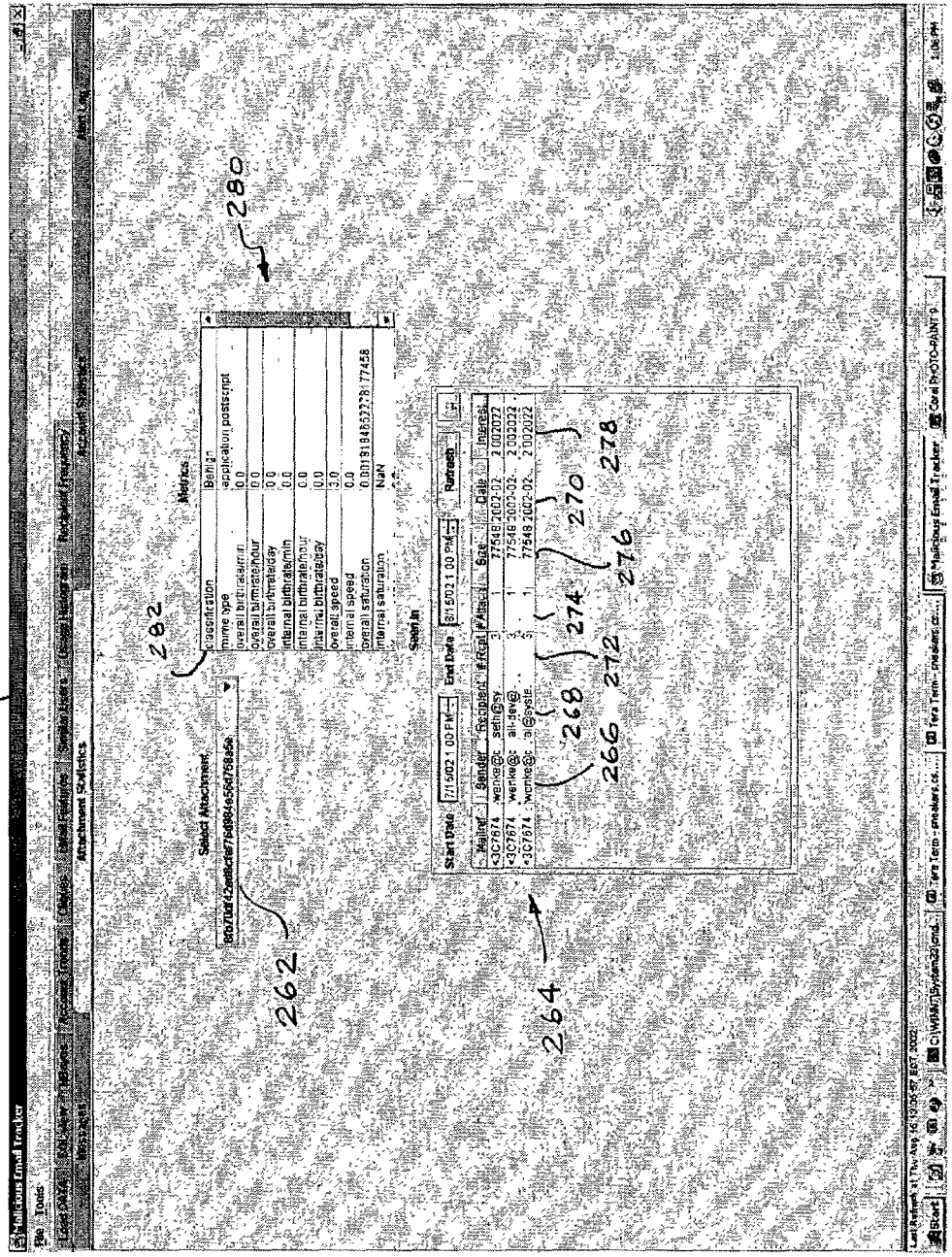
FIG. 4 is yet another screen of the user interface, illustrating information displayed concerning attachments to emails transmitted through the system in accordance with the present invention.

Information concerning attachments as illustrated in FIG. 4. Screen 260 of the user interface of the exemplary embodiment illustrates that each attachment is represented by a unique MD5 hash identifier 262, as discussed above. Information regarding the transmission of the attachment is stored and illustrated in table 264. In particular, table 264 duplicates some of the information of screen 200 (FIG. 2) and indicates the sender email account 266, the recipient email account 268, and the time and date of transmission 270 of each email which included the attachment. Further information recorded is the number of recipients 272 of the particular email that included the attachment, the total number of attachments 274 in that email, and the size of the attachment 276. Further information is the level of "interest" 278 of the attachment, which is a numerical figure generated, for example, by a probabilistic model such as Naive Bayes, regarding whether the attachment is malicious, benign or borderline, as determine by a virus scanner, or by the technique described in U.S. patent application Ser. No. Ser. No. 10/208,432, filed Jul. 30, 2002, entitled "System and Methods for Detection of New Malicious Executables," which is incorporated by reference above. Table 280 includes the classification malicious, benign or borderline, which is derived from the level of interest 278, above. Additional information about the birthrate, and other statistics about the attachment are recorded and displayed in screen 260.

This information may be stored on database 24 of client 20 and distributed to the server 40 (and database 42), and in turn to others clients 20, which could update its local database 24 by including the unique attachment identifier along with its classification as malicious, so that any future emails that appear with an attachment whose MD5 hash matches the unique identifier would cause each client to alert on that email as containing a malicious attachment. MySQL, for example, may be used in the exemplary embodiment, which is a well-known open source database system.

The server 40 also contains a data analysis component 44 which performs the analysis over these records, such as computation or updating of statistics in the database 42 about attachments or emails, as well as application of probabilistic or statistical models or tests in order to generate alerts of emails or attachments that violate security policy. For example, a model which is used to classify an attachment as benign, malicious, or borderline may be performed at the data analysis component 44. This model may be updated with additional training data, which may be different from the model that is used to classify attachments at the client 20. A communication component 46 manages the communication with multiple clients 20. The communication between the server 40 and the client 20 consists of messages passed on a secured channel using encryption and authentication mechanisms.

When a client 20 reports an incident of a received email attachment that is violative of a security policy, it may report a unique incident identification number, the unique identifier of the attachment, the date and time of the attack, the prevalence, and the birth rate.

Additional statistics may be computed for each attachment and stored on databases 24/42 and displayed, for example, in table 280 of screen 260 of the user interface. A virus incident is the fraction of the total number of clients 20 within an organization infected by a particular virus, due to a single initial infection from outside the organization. Since each attachment is saved in the local database 24 with a Unique identifier and malicious or benign classification, this value is simply the number of times each malicious unique identifier appears in the local database 24. The lifespan is the length of time a virus is active. This value is calculated by subtracting the first time a virus is seen from its last occurrence in the local repository. This values reports the amount of time a virus was free to cause damage to a network before it was detected. The Incident rate is the rate at which virus incidents occur in a given population per unit time, normalized to the number of clients 20 in the population. This is calculated by the server 40 based on the virus incident values reported by the local server. The death rate is the rate at which a virus is detected. This is calculated by the server 40 by taking the average lifespan of the virus. The system prevalence is a measure at the system level of the total number of clients 20 infected by a particular virus. This value is calculated by the central repository by summing over the number of local hosts reporting the same virus. The threat is the measure of how much of a possible danger a virus may be. In an exemplary embodiment, threat is calculated as the incident rate of a virus added to the prevalence of a virus divided by the total number of participating clients 20 and the total number of viruses. Spread is a measure of the global birth rate of a virus. This is calculated by taking the average of the birth rates reported by the participating clients 20. These metrics may be directly implemented by computing SQL aggregates over the databases (both local 24 and central 42). Each time a client 20 determines that an attachment is a virus, it sends a report to the server 40, and the server 40 updates it statistics for that virus.

The system 10 may also gather statistics about the behavior and features of individual email accounts 26, which is a representation of the users of these accounts. The information gathered about individual emails, as well as email accounts themselves, is useful to detecting violations of an email security policy. For example, email account statistics may be derived for recipient and sender email addresses recorded in the database. The statistics gathered about the prior transmission of email to and from a particular email account can be used as training data to create a probabilistic or statistical model of an email account. This model provides a profile of the past or baseline behavior patterns of a particular email account. The selected behavior may refer to a particular time frame of interest, e.g., the previous month. Where the selected behavior of the particular email account deviates from this profile of prior or baseline behavior, the system 10 may issue an alert that a violation of an email security policy has occurred.

This profile of behavior patterns may be represented as a histogram, for example. A histogram is a way of graphically showing the characteristics of the distribution of items in a given population of samples. In the exemplary embodiment, histograms are used to model the behavior of particular email accounts. From a training set, e.g., the statistics as discussed above, a histogram is constructed to represent the baseline behavior of an email account. A histogram is also created to represent selected behavior of the email account.

Histograms may model statistics, e.g., events or operations, which are accumulated over a fixed time period. Each bin in the histogram counts some number of events in fixed time periods. For example, a histogram may record the average number of emails sent by an email account each day during the previous month, wherein each bin represents a day, hour, or other time period. Alternatively, histograms may model statistics accumulated irrespective of a time period. In such case, each bin is not a fixed time period, but some other feature. For example, over a set of emails from an arbitrary time period (gathered over a month, or gathered over a year, etc.) a histogram recording the number of email sent to a distinct recipient, wherein each bin represents a recipient, for example.

Figure 5:
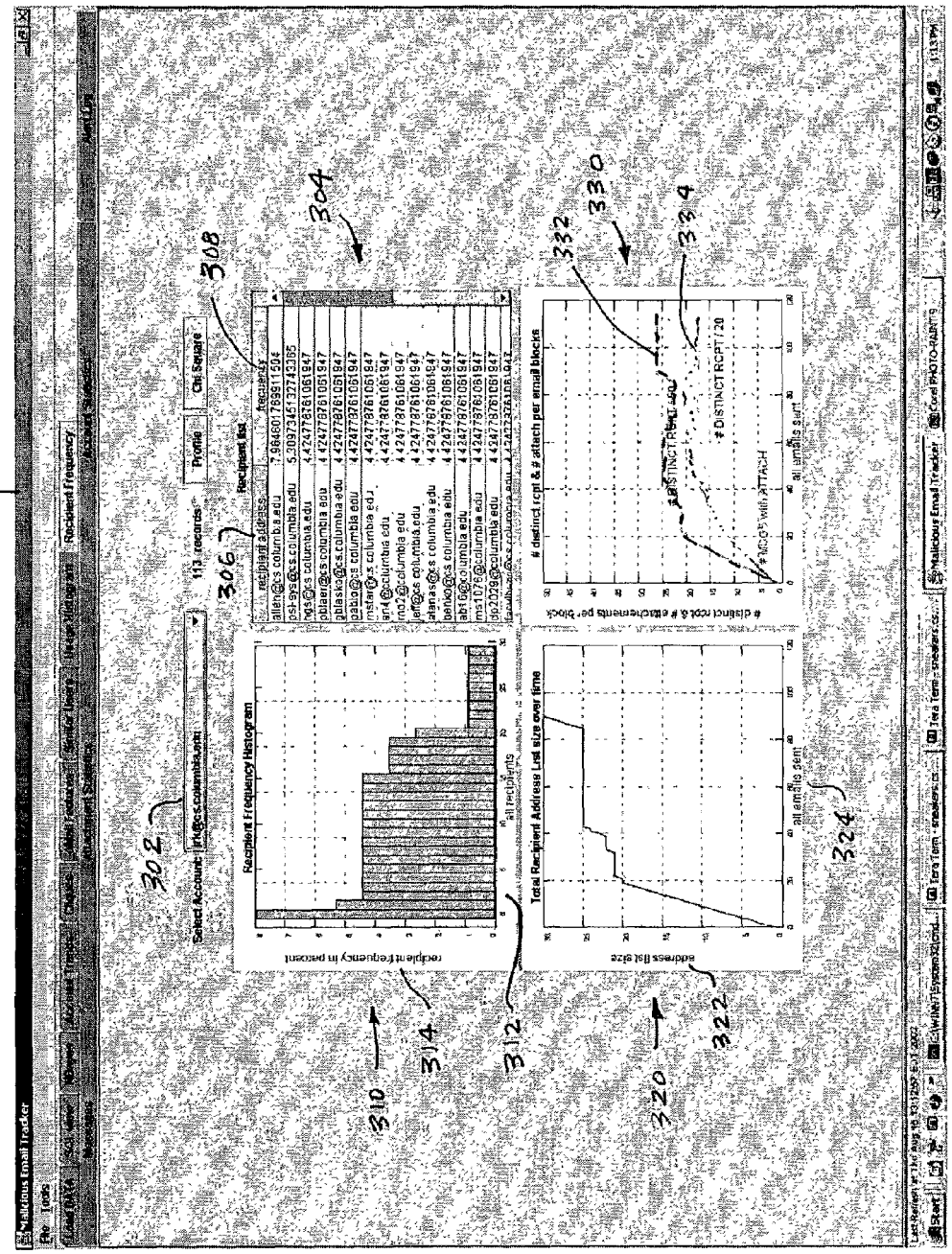
FIG. 5 is a further screen of the user interface, illustrating information displayed concerning email accounts in accordance with the present invention.

FIG. 5 illustrates a screen 300 in the user interface of the exemplary embodiment, which illustrates histograms that may be stored for an email account 302 In the example, statistics are gathered for an email account 302 over a predetermined period of time, e.g., the previous twelve months. The system counts the number of emails sent by this email account 302 to a specific recipient. Table 304 shows each recipient email address 306 and the relative frequency 308 at which user account 302 has emailed each recipient. In histogram 310, each recipient would be considered a bin 312, which indicates the frequency of emails 314 for each recipient. If an email account has sent emails over the past twelve months to 900 different email accounts, for example, then the email account's profile histogram would have 900 bins. A histogram computed over the twelve months would serve as a statistical model of baseline behavior of the email account. The histogram's bins can be ordered from "most frequent" recipient to "least frequent" recipient and display these as a bar graph 310 (as in FIG. 5), or alternatively, the statistics may be represented as a continuous function or a plotted graph. The bins of the histogram may be ordered differently, by for example, sorting the recipient names, or grouping recipients according to email domain. A histogram of selected behavior may include bins for each email recipient, and taken over the selected time period.

A sequential profile can be represented which is irrespective of the quanta of time measured (non-stationary), but which instead uses each email as a measurement point. With continued reference to FIG. 5, plot 320 illustrates the number of recipients 322 who received email from user account 302. The list grows over the history of recorded emails as more emails 324 are sent. Graph 320 monotonically increases for each sequential email measured. The growth rate of this plot indicates a profile of the email account. A plot that is very slowly increasing indicates that the email account does not exchange emails with very many new email accounts. While another email account may have a very fast growing profile, perhaps indicating that the user of the email account may be contacted by very many new people. A histogram for normal behavior may be taken over one time period, and histogram for new behavior may be taken over a second time period. Graph 330 illustrates the distinct number of recipient per 50 emails sent (dashed line 332) and the distinct number of recipients per 20 emails sent (dotted line 334). As another example, the first 100 emails sent in order over some time period by an email account were sent to ten distinct email addresses. In the $101^{st}$-$110^{th}$ emails, no new email addresses are seen that are distinct from those seen in the first 100 emails. However, two new distinct email addresses are seen in the $112^{th}$ email. For this email, we have a net gain of two more emails. Such growth rates are statistics that may be used to detect violations of security policy.

Once such histograms have been created, the histogram of the baseline behavior is compared with the histogram of the selected behavior to determine whether the new behavior represents a deviation that may be classified as a violation of email security policy. There are many known methods to compute the histogram dissimilarity. Generally such methods may be divided into two categories: One method is using a histogram distance function; the other method is to use a statistics test. A histogram can be represented by a vector.

Histograms may be compared with the L1 form distance equation. Histogram intersection is represented in equation (1), where X and Y are vectors representing the normal behavior histogram and the new behavior histogram. M is the number of bins in histogram.

$$L(X, Y) = 1 - \frac{\sum_{i=0}^{M-1} \min(X[i], Y[i])}{\min\left(\sum_{i=0}^{M-1} X[i], \sum_{i=0}^{M-1} Y[i]\right)} \quad (1)$$

When the sums of X[i] and Y[i] are equal, the histogram intersection formula of equation (1) may be simplified to the L1 form distance equation (2):

$$L_1(X, Y) = \sum_{i=0}^{M-1} |X[i] - Y[i]| \quad (2)$$

Alternatively, histograms may be compared with the L2 form distance equation (3):

$$L_2(X, Y) = \sum_{i=0}^{M-1} (X[i] - Y[i])^2 \quad (3)$$

The L1 and L2 form equations assume that the individual components of the feature vectors, e.g., the bins of the histograms, are independent from each other. Each of the bins are taken to contribute equally to the distance, and the difference of content between the various bins is ignored.

Other distance equations are the weighted histogram difference equations, e.g., the histogram quadratic distance equation and the histogram Mahalanobis distance equation. The histogram quadratic difference equation (4) considers the difference between different bins.

$$D(X,Y) = (X-Y)^T A (X-Y) \quad (4)$$

In equation (4), A is a matrix and $a_{ij}$ denotes the similarity between elements with index i and j. A symmetry is assumed, such that $a_{ij} = a_{ji}$, and $a_{ii} = 1$.

The Mahalanobis distance is a special case of the quadratic distance equation. The matrix A is given by the covariance matrix obtained from a set of training histograms. Here, the elements in the histogram vectors are treated as random variables, i.e., $X = [x_0, x_1, \ldots, x_{M-1}]$. The covariance matrix B is defined as $b_{ij} = \text{Cov}(x_i, x_j)$. The matrix A is thus defined as $A=B^{-1}$. When the $x_i$ are statistically independent, but have unequal variance, matrix B is a diagonal matrix:

$$B = \begin{bmatrix} \sigma_0^2, 0, 0, \ldots, 0 \\ 0, \sigma_1^2, 0, \ldots, 0 \\ 0, \ldots, 0, 0 \\ 0, \ldots 0, 0, \sigma_{M-1}^2 \end{bmatrix} \quad (5)$$

This method requires a sufficiently large training set (of prior email transmission statistics) in order to allow the covariance matrix to accurately represent the training data.

The chi-square test is used to test if a sample of data came from a population with a specific distribution. It can be applied to any uni-variance distribution for which it is possible to calculate the cumulative distribution function. However, the value of chi-square test statistic depends on how the data is binned, and it requires a sufficient sample size. The chi-square test is represented by equation (6):

$$\chi^2 = \sum_{i=1}^{k} (O_i - E_i)^2 / E_i \quad (6)$$

where k is the number of bins $O_i$ is the observed frequency for bin i, and $E_i$ is the expected frequency. The expected frequency is calculated as:

$$E_i = N(F(Y_u) - F(Y_l)). \quad (7)$$

where F is the cumulative distribution function, $Y_u$ is the upper limit for class i, $Y_l$ is the lower limit for class i, and N is the sample size.

The Kolmogorov-Simironov test (the "KS test") is a statistical test which is designed to test the hypothesis that a given data set could have been drawn from a given distribution, i.e., that the new behavior could have been drawn from the normal behavior. The KS test is primarily intended for use with data having a continuous distribution, and with data that is independent of arbitrary computational choice, such as bin width. The result D is equal to the maximum difference between the cumulative distribution of data points.

$$D = \max\{|F'(x) - F(x)|\}, F'(x) = (\text{num\_of\_samples} \leq x)/N \quad (8)$$

and where N is total number of samples The KS test does not depend on the underlying cumulative distribution function which is being tested, and it is an exact test (when compared with the Chi-Square test, which depends on an adequate sample size for the approximations to be valid). The KS test may only be applied to continuous distribution; it tends to be more sensitive near of the center of the distribution than at the tails.

Figure 6:
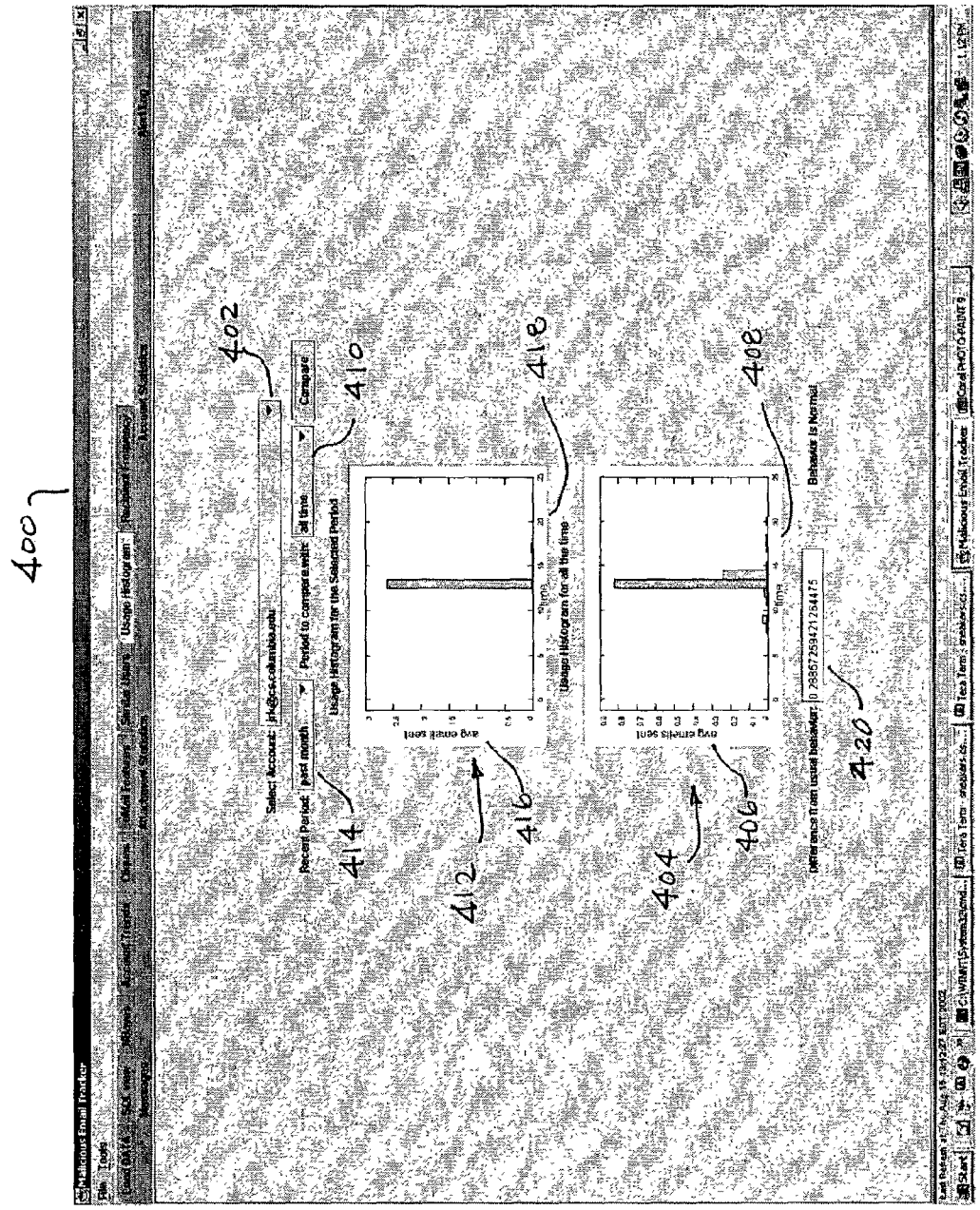
FIG. 6 is a screen of the user interface, illustrating histograms of email transmission by an email account in accordance with the present invention.

The modeling of the behavior of an email account may include defining a model based on the time of day in which emails are transmitted by a particular email account. FIG. 6 illustrates screen 400, which compares such email transmission for user account 402. Histogram 404 illustrates the average number of emails 406 sent for each bin 408, which represents each hour of the 24 hours in a day. The data in histogram 404 is accumulated for a predetermined period of time, e.g., the entire period that user account 402 has been tracked by the system 10 (time period 410). Histogram 412 is created for email transmission during a selected period of time being analyzed, e.g., the last month (time period 414). Histogram 412 illustrates the average number of emails 416 sent during each hour as represented by bins 418. The histogram 404 of baseline behavior is compared with the histogram 412 of the selected behavior, with a comparison equation such as the Mahalanobis distance equation, above, to produce a distance result 320. A threshold is set, which determines whether such a calculated difference is normal or may possibly violate security policy. The threshold may be determined by training on known data representative of email account behavior which violated security policy, when compared with known, normal, email behavior. The histogram 404 of the baseline behavior of user email account 302 shows that emails are rarely sent early in the morning. Thus, a violation in the security policy may be detected if a series of email are transmitted from user email account 302 at such time of day. Similarly, the modeling of the behavior of an email account may include defining a model based on the size of the emails that are transmitted by an email account or on the number of attachments that are transmitted by the email account Another method for defining a model relating to the transmission of emails from one of the email accounts is based on the email addresses of the recipients of emails transmitted by the particular email account. Thus, another statistic or feature gathered by the method in accordance with the invention is the email addresses of recipients in each email. The recipients of the emails may be grouped into "cliques" corresponding to email addresses historically occurring in the same email.

A clique is defined as a cluster of strongly related objects in a set of objects. A clique can be represented as a subset of a graph, where nodes in the graph represent the "objects" and arcs or edges between nodes represent the "relationships" between the objects. Further, a clique is a subset of nodes where each pair of nodes in the clique share the relationship but other nodes in the graph do not. There may be many cliques in any graph.

Figure 7:
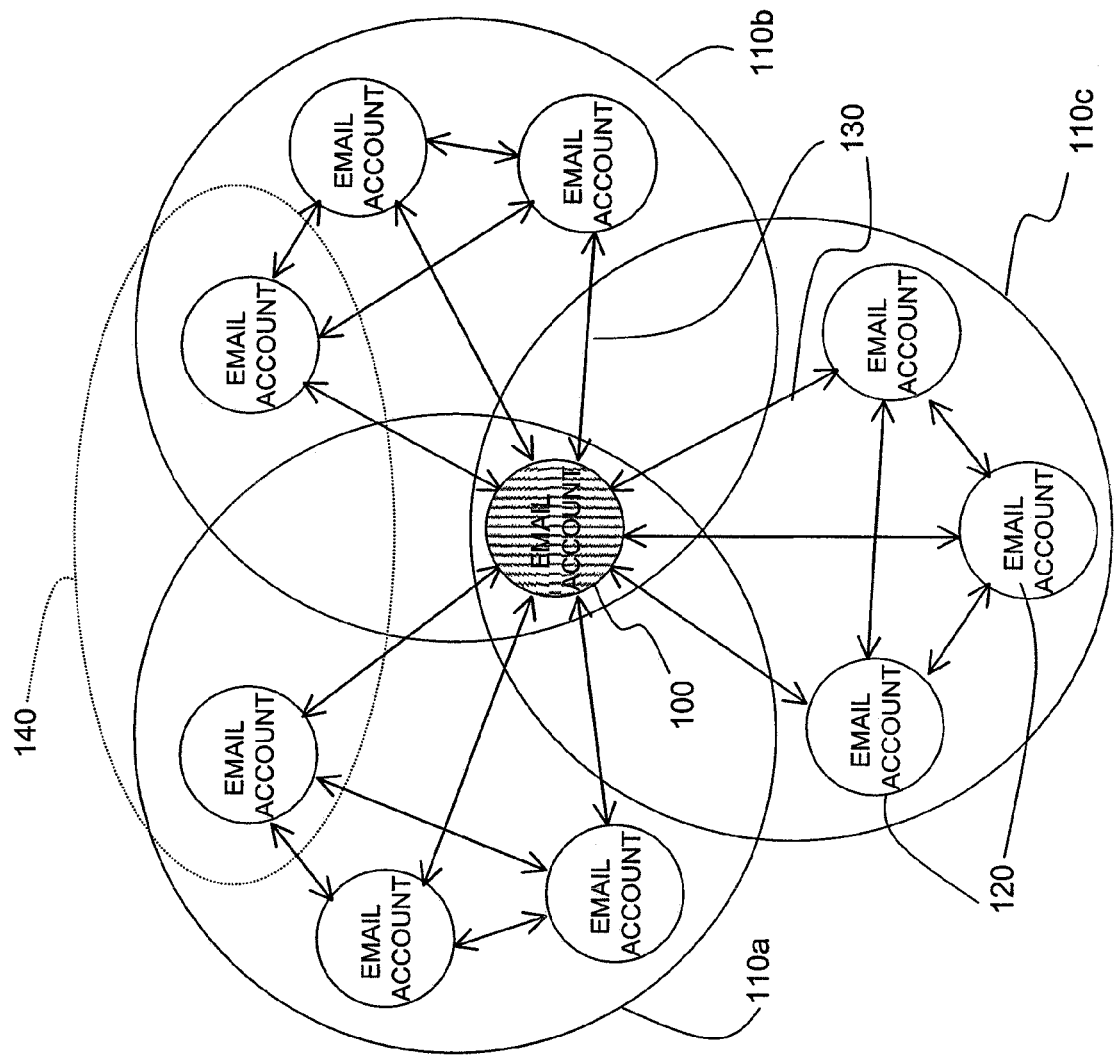
FIG. 7 is a sample chart illustrating the relationship of email accounts and emails between various email accounts on a system in accordance with the present invention.

In this context, the nodes are email addresses (or accounts) and the edges represent the "emails" (and or the quantity of emails) exchanged between the objects (email accounts). Each email account is regarded as a node, and the relationship between them is determined by the to:, from:, and cc: fields of the emails exchanged between the email accounts. As illustrated in FIG. 7, a selected email account 100 induces its own set of cliques 110a, 110b, 110c, which are clusters of email accounts 120 of which it is a member. Each member in the clique has been determined to historically exchange emails 130 with each other. This modeling of email cliques is based on the premise that a user's "social cliques" and the nature of the relationship between members of a clique can be revealed by their "email cliques."

The relationship between nodes that induces the cliques can be defined under different periods of time, and with different numbers of emails being exchanged, or other features or properties. For example, an edge (as represented by line 130 in FIG. 7) between email account UserA@z.com and email account UserB@z.com may be represented if UserA and UserB have exchanged at least N emails over the time period T. (As one varies N, the cliques revealed may change.) As another example, an edge between UserC and UserD may be represented if they have exchanged at least N emails with each other in the time period T, and each email is at least K bytes long. Such features of emails are based upon the kind of information an analyst may wish to extract from a set of emails. As a further example, one may define the clique relationship to be the set of accounts that exchange at least N emails per time period T and which include certain string of text S. (Further details concerning clique finding algorithms and related problems are disclosed in *Cliques, Coloring and Satisfiability: Second Dimacs Implementation Challenge*, D. Johnson and M. Trick, Ed., 1993, which is incorporated by reference in its entirety herein.)

FIG. 7 illustrates the email behavior of the user of email account 100. For example, the three clusters may represent cliques of social acquaintances 110a, clients 110b, and coworkers 110c. (Although four email accounts are shown in each clique 110a, 110b, and 110c, it is understood that the number of email accounts may be larger or smaller depending upon the historical email use of the particular email accounts.) Each of these groups of users with their own email accounts 120, have a relationship with the user of email account 100. Members of different cliques, i.e., social acquaintances 110a and clients 110b are unlikely to have common interests or concerns. Thus, it is unlikely that the user of email account 100 would send the same email to both cliques. More particularly, it is unlikely that email account 100 would send an email 140 addressed to both an email account in clique 110a and an email account in clique 110b (illustrated in dotted line).

Cliques are determined according to any number of known methods. In the exemplary embodiment, cliques are modeled as described in C. Bron and J. Kerbosch. "Algorithm 457: Finding All Cliques of an Undirected Graph," *Communications of ACM*, 16:575-577, 1973, which is incorporated in The Appendix and the attached routine Clique_finder.

First, the graph is built by selecting all of the rows from the email table in the database. As illustrated in FIG. 2, above each row contains the sender 204, and the recipient 206. The subject line may also be stored (although not illustrated in FIG. 2).

A first step is to check an aliases file against the sender and recipient to map all aliases to a common name. For instance, a single user may have several accounts. This information, if available, would be stored in an aliases file.

Figure 8:
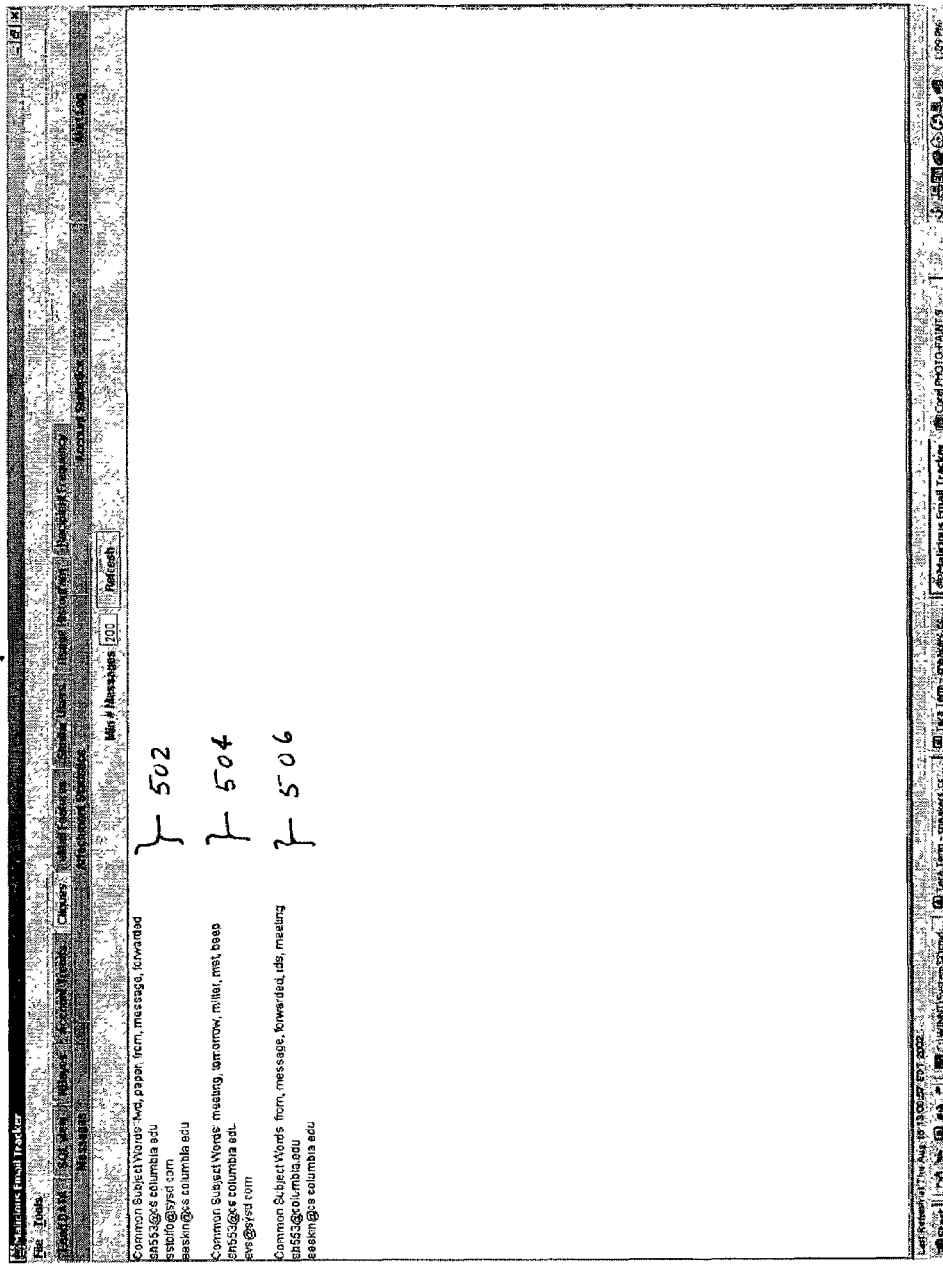
FIG. 8 is a screen of the user interface, illustrating information displayed concerning groups or cliques of email accounts in accordance with the present invention.

The edge between sender and recipient is updated (or added if it doesn't already exist). (The edge is represented as line 130 in FIG. 7.) Each edge of the graph may have associated with it (1) the number of emails that traversed that edge and (2) a weighted set of subject words where each word has a count of the number of times it occurred. The edge's weight is incremented by one, and the weighted set of subject words associated with the edge is augmented by the set of subject words from the current message. Cliques are represented in screen 500 of the user interface in FIG. 8. Cliques 502, 504, and 506 are displayed, along with the most common subject words in emails transmitted among members of the clique.

A next step is pruning the graph. The user inputs a minimum edge weight, or minimum number of emails that must pass between the two accounts to constitute an edge, and any edges that don't meet that weight are eliminated. For example, the minimum number of emails may be determined from the average number of emails sent by the email account over a similar time period.

Subsequently, the cliques are determined. Throughout this process, there exist four sets of data: (1) *compsub* represents a stack of email user accounts representing the clique being evaluated. Every account in *compsub* is connected to every other account. (2) *candidates* represents a set of email user accounts whose status is yet to be determined. (3) *not* represents a set of accounts that have earlier served as an extension of the present configuration of *compsub* and are now explicitly excluded. (4) *cliques* represents a set of completed cliques In the exemplary embodiment, these are implemented using the Java Stack and HashSet classes rather than the array structure suggested in the Bron & Kerbosch in The Appendix and the routine Clique_finder attached herein.

The algorithm is a recursive call to extendClique( ). There are five steps in the algorithm: Step 1 is the selection of a candidate, i.e., an email user account which may be prospectively added to the clique. Step 2 involves adding the selected candidate to *compsub*. Step 3 creates new sets *candidates* and *not* from the old sets by removing all points not connected to the selected candidate (to remain consistent with the definition), keeping the old sets intact. Step 4 is calling the extension operator to operate on the sets just formed. The duty of the extension operator is generate all extensions of the given configuration of *compsub* that it can make with the given set of candidates and that do not contain any of the points in *not*. Upon return, step 5 is the removal of the selected candidate from *compsub* and its addition to the old set *not*.

When *candidates* and *not* are both empty, a copy of *compsub* is added to *cliques*. (If *not* is non-empty it means that the clique in *compsub* is not maximal and was contained in an earlier clique.) A clique's most frequent subject words are computed by merging and sorting the weighted sets of subject words on each edge in the clique.

If we reach a point where there is a point in *not* connected to all the points in *candidates*, the clique determination is completed (as discussed in The Appendix). This state is reached as quickly as possible by fixing a point in *not* that has the most connections to points in *candidates* and always choosing a candidate that is not connected to that fixed point.

A clique violation occurs if a user email account sends email to recipients which are in different cliques. If an email 140 is detected, this occurrence of an email having a recipient in two different cliques may be considered a clique violation, and may indicate that either a) email account 100 made a mistake by sending an inappropriate message to either a social acquaintance or to a client or b) a self-replicating email attachment has accessed the address book for the email account 100 and is transmitting itself to email accounts in the address-book without knowledge the cliques 110a, 110b, 110c of email account 100.

A strength of the clique violation may be measured by counting the number of such violations in a single email, e.g., the number of recipients who are not themselves part of the same clique, and/or the number of emails being sent, or other features that may be defined (as the system designer's choice) to quantify the severity of the clique violation. (For example, if email account 100 sent one message to 15 recipients, and one of these recipients is not a member of a clique that the other 14 belong to, that may be considered a minor violation compared with another email that is directed to 15 recipients none of whom are members of the same clique.) The strength of the violation may be used to set conditions (or thresholds) which are used to provide alerts in the system 10. Alerts may then be generated based upon the strength of the violation. In another embodiment, those recipients that receive few emails from the sender may be weighted higher than those recipients that receive many emails from the sender.

Clique violations may also be determined from multiple email messages, rather than from just one email. For example, if a set of emails are sent over some period of time, and each of these emails are "similar" in some way, the set of email accounts contained in those emails can be subjected to clique violation tests. Thus, the email recipients of email sent by a particular use is used as training data to train a model of the email account.

If a specific email account is being protected by this method of modeling cliques and detecting clique violations, such violations could represent a misuse of the email account in question. For example, this event may represent a security violation if the VP of engineering sends an email to the CEO concurrently with a friend who is not an employee of the VP's company. Similarly, a clique violation would occur when a navy lieutenant sends a secret document to his commanding officer, with his wife's email account in the CC field. These are clique violations that would trigger an alert.

The techniques described herein can also be used a) to detect spam emails (which may or may not and generally do not have attachments, and b) to detect spammers themselves. Spam generally has no attachments, so other statistics about email content and email account behavior are needed to be gathered here by system 10 in order to also detect spam. Spam can be detected by considering clique violations. In particular, if an email account sends or receives emails from other email accounts that are not in the same clique, an alert may be issued which would indicate that such email transmissions are likely spam.

The methods described above generally refer to defining probabilistic or statistical models which define the behavior of individual email accounts. Also useful are models relating to statistics for emails transmitted by the plurality of email accounts on the computer system.

Detecting email accounts that are being used by spammers may allow an internet service provider or server 40 to stop spam from spreading from their service by shutting down an email account that has been detected as a generator of spam. To detect spammers, these email accounts would have a certain profile of email use that may be regarded as a bad profile as determined by supervised machine learning process, for example. Thus, the notion of profiling i.e., gathering statistics about an email account's behavior, is used here as well. According to this embodiment, email profiles are compared to other email profiles, rather than comparing statistics about emails to profiles.

Figure 9:
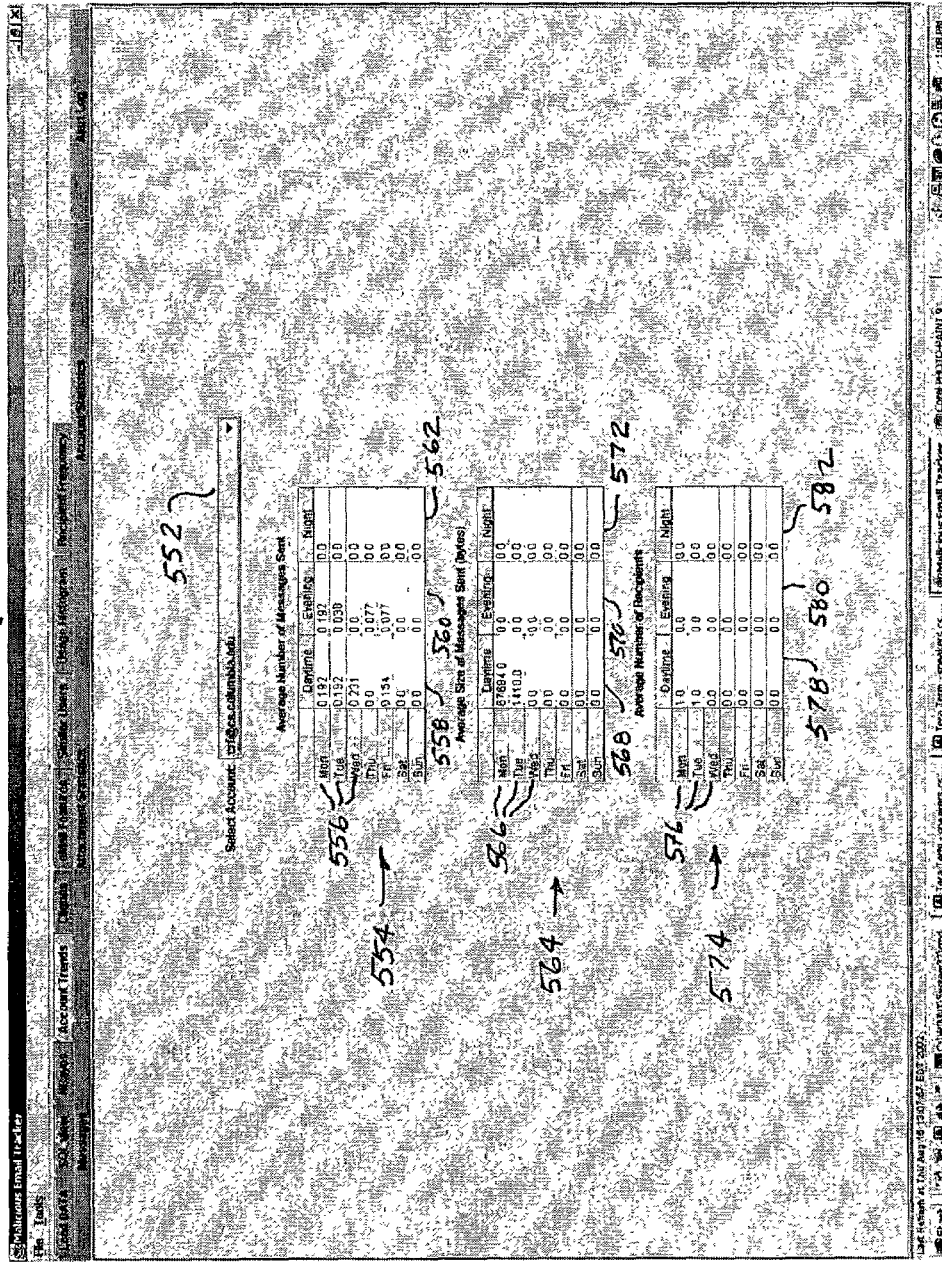
FIG. 9 is another screen of the user interface, illustrating information displayed concerning emails statistics of an email account in accordance with the present invention.

Individual profiles may be represented by histograms in screen 550 of the user interface as illustrated in FIG. 9 for user 552. Histogram 554 indicates the average number of emails sent on particular days of the week 556, and sorted in bins for daytime 558, evening 560, and night 562. Similarly, histogram 564 indicates the average size (in bytes) of emails sent on particular days of the week 566, and sorted in bins for daytime 568, evening 570, and night 572. Histogram 574 indicates the average number of recipients for each email sent on particular days of the week 576, and sorted in bins for daytime 578, evening 580, and night 582.

EXAMPLE

Detection of a "spammer" may be performed by comparing email account profiles, such as those illustrated in FIG. 9. The following three profiles, or models, are created from statistics gathered by the system:

Profile 1: Histogram of average number of emails sent per minute and per day by a user account computed over a one week period. (Table 1)

TABLE 1

| Average Number of Emails Sent | Account A | Account B |
| --- | --- | --- |
| Per minute | 0.5 | 100 |
| Per day | 11 | 12,000 |

Profile 2: Histogram of average number of recipients per email for morning, day, night. (Table 2)

TABLE 2

| Average Number of Recipients of Email by Time of Day | Account A | Account B |
| --- | --- | --- |
| Morning | 1 | 15 |
| Day | 5 | 15 |
| Night | 1 | 15 |

Profile 3: Histogram of cumulative number of distinct email account recipients per email sent (which may be plotted as a function, or even represented by a closed form functional description modeled as a linear function, or a quadratic function, etc.)

TABLE 3

| Cumulative Distinct Email account recipients | Account A | Account B |
| --- | --- | --- |
| Email 1 | 1 | 15 |
| Email 2 | 1 | 27 |
| Email 3 | 2 | 43 |
| ... | ... | ... |
| Email 55 | 7 | 1236 |

Given these three profiles, Account A appears to have a profile showing very modest use of emails, with few recipients. Account B on the other hand appears to be a heavy transmitter of emails. In addition, there seems to be evidence that the behavior of Account B is indicative of a 'drone' spammer. Such determination may be made by comparing the histograms of Account A (considered a "normal" user) with the histograms of Account B, and determining the difference between the two. Equations (1)-(8), above, are useful for this purpose. For example, the histogram of Table 2 indicates that the behavior of Account B may be consistent with running a program that is automatically sending emails to a fixed number of recipients (e.g., 15), and the histogram of Table 3 indicates that there is a very large number of email addresses in Account B's address book. In the illustration, Account B has already generated 1236 distinct address by email 55. The inference can therefore be made that Account B is a spammer. This type of profile can be used to find other similar profiles of other accounts indicative of other spammers.

It will be understood that the foregoing is only illustrative of the principles of the invention, and that various modifications can be made by those skilled in the art without departing from the scope and spirit of the invention.

APPENDIX

Adapted from C. Bron and J. Kerbosch. "Algorithm 457: Finding all Cliques of an Undirected Graph," Communications of ACM, 16:575-577, 1973, A maximal complete subgraph (clique) is a complete subgraph that is not contained in any other complete subgraph. Two backtracking algorithms are presented using a branch-and-bound technique (as discussed in Little, John et al., "An algorithm for the traveling Salesman Problem," *Oper. Res.* 11 (1963), 972-989) to cut off branches that cannot lead to a clique.

The first version is a straightforward implementation of the basic algorithm. It is mainly presented to illustrate the method used. This version generates cliques in alphabetic (lexicographic) order.

The second version is derived from the first and generates cliques in a rather unpredictable order in an attempt to minimize the number of branches to be; traversed. This version tends to produce the larger cliques first and to generate sequentially cliques having a large common intersection. The detailed algorithm for version 2 is presented here.

Description of the algorithm—Version 1. Three sets play an important role in the algorithm. (1) The set compsub is the set to be extended by a new point or shrunk by one point on traveling along a branch of the backtracking tree. The points that are eligible to extend compsub, i.e. that are connected to all points in compsub, are collected recursively in the remaining two sets. (2) The set candidates is the set of all points that will in due time serve as an extension to the present configuration of compsub (3) The set not is the set of all points that have at an earlier stage already served as an extension of the present configuration of compsub and are now explicitly excluded. The reason for maintaining this set not will soon be made clear.

The core of the algorithm consists of a recursively defined extension operator that will be applied to the three sets just described. It has the duty to generate all extensions of the given configuration of compsub that it can make with the given set of candidates and that do not contain any of the points in not. To put it differently: all extensions of compsub containing any point in not have already been generated. The basic mechanism now consists of the following five steps:

Step 1. Selection of a candidate.
Step 2. Adding the selected candidate to compsub.
Step 3. Creating new sets candidates and not from the old sets by removing all points not connected to the selected candidate (to remain consistent with the definition), keeping the old sets in tact.
Step 4. Calling the extension operator to operate on the sets just formed.
Step 5. Upon return, removal of the selected candidate from compsub and its addition to the old set not.

The extra labor involved in maintaining the sets not is now described. A necessary condition for having created a clique is that the set candidates be empty; otherwise compsub could still be extended. This condition, however, is not sufficient, because if now not is nonempty, from the definition of not indicates that the present configuration of compsub has already been contained in another configuration and is therefore not maximal. Compsub is considered a clique as soon as both not and candidates are empty.

If at some stage not contains a point connected to all points in candidates, it can be predicted that further extensions (further selection of candidates) will never lead to the removal (in Step 3) of that particular point from subsequent configurations of not and, therefore, not to a clique. This is the branch and bound method which enables detection in an early stage of branches of the backtracking tree that do not lead to successful endpoints.

The set compsub behaves like a stack and can be maintained and updated in the form of a global array. The sets candidates and not are handed to the extensions operator as a parameter. The operator then declares a local array, in which the new sets are built up, that will be handed to the inner call. Both sets are stored in a single one-dimensional array with the following layout:

|not|candidates index values: 1 . . . ne . . . ce . . .

The following properties obviously hold:

1. ne≦ce 2. ne=ce:empty (candidates)

3. ne=0:empty (not)

4. ce=0:empty (not) and empty (candidates)
   =clique found

If the selected candidate is in array position ne+1, then the second part of Step 5 is implemented as ne:=ne+1.

In version 1 we use element ne+1 as the selected candidate. This strategy never gives rise to internal shuffling, and thus all cliques are generated in a lexicographic ordering according to the initial ordering of the candidates (all points) in the outer call.

Description of the algorithm—Version 2. This version does not select the candidate in position ne+1, but a well-chosen candidate from position, say s. In order to be able to complete Step 5 as simply as described above, elements s and ne+1 will be interchanged as soon as selection has taken place. This interchange does not affect the set candidates since there is not implicit ordering. The selection does affect, however, the order in which the cliques are eventually generated.

The term "well chosen" is now explained. The object is to minimize the number of repetitions of Steps 1-5 inside the extension operator. The repetitions terminate as soon as the bound condition is reached. This condition is formulated as: there exists a point in not connected to all points in candidates. We would like the existence of such a point to come about at the earliest possible stage.

Is assumed that with every point in not is associated a counter, which counts the number of candidates that this point is not connected to (number of disconnections). Moving a selected candidate into not (this occurs after extension) decreases by one all counters of the points in not to which it is disconnected and introduces a new counter of its own. Note that no counter is ever decreased by more than one at any one instant. Whenever a counter goes to zero the bound condition has been reached.

One particular point in not is fixed. If candidates disconnected to this fixed point are selected repeatedly, the counter of the fixed point will be decreased by one at every repetition. No other counter can go down more rapidly. If, to begin with, the fixed point has the lowest counter, no other counter can reach zero sooner, as long as the counters for points newly added to not cannot be smaller. We see to this requirement upon entry into the extension operator, where the fixed point is taken either from not or from the original candidates, whichever point yields the lowest counter value after the first addition to not. From that moment on this one counter is maintained, decreasing it for every next selection, since only select disconnected points are selected.

The Algol 60 implementation of this version is given below. The implementation in the exemplary embodiment is Clique_finder in the attached computer listing.

Algorithm

```
procedure output maximal complete subgraphs 2(connected, N);
    value N; integer N;
    Boolean array connected;
comment The input graph is expected in the form of a symmetrical
    boolean matrix connected. N is the number of nodes in the graph. The
    values of the diagonal elements should be true;
begin
    integer array ALL, compsub [1 : N];
    integer c;
    procedure extend version 2(old, ne, ce);
        value ne, ce; integer ne, ce;
        integer array old;
    begin
        integer array new [1 : ce];
        integer nod, fixp;
        integer newne, newce, i,j, count, pos, p, s, sel, minnod;
        comment The latter set of integers is local in scope but need
            not be declared recursively;
        minnod : = ce; i: = nod: = 0;
DETERMINE EACH COUNTER VALUE AND
LOOK FOR MINIMUM:
        for i := i + 1 while i ≦ ce Λ minnod 0 do
        begin
            p : = old[i]; count :=0; i := ne;
COUNT DISCONNECTION:
            for j := j + 1 while j ≦ ce Λ count > minnod do
                if ⌐connecte[p, old[j]] then
                begin
                    count :=count + 1;
SAVE POSITION OF POTENTIAL CANDIDATE:
                    pos : = j
                end;
TEST NEW MINIMUM:
                if count < minnod then
                begin
                    fixp : = p; minnod : = count;
                    if i ≦ ne then s : = pos
                else
                    begin s : = i; PREINCR: nod: = 1 end
            end NEW MINIMUM;
        end i;
        comment If fixed point initially chosen from candidates then
            number of disconnections will be preincreased by one;
BACKTRACKCYCLE:
        for nod : = minnod + nod step - 1 until 1 do
        begin
INTERCHANGE:
            p : = old[s]; old[s] : = old[ne + 1];
            sel : = old[ne + 1] : p;
FILL NEW SET not:
            newne : = i : = 0;
            for i : = i + 1 while i ≦ ne do
                if connected [sel, old[i]] then
                begin newne : = newne + 1; new[newne]: : = old[i] end;
FILL NEW SET cand:
            newce : = newne; i : = ne + 1;
            for i : = i + 1 while i ≦ ce do
                if connected[sel, old[i]] then
                begin newce : = newce + 1; new[newce] : = old[i]end;
ADD TO compsub:
            c : = c + 1; compsub [c] : = sel;
            if newce = 0 then
            begin
                integer loc;
                outstring (1, 'clique = ');
                for loc : = 1 step 1 until c do
                    outinteger (1, compsub[loc])
            end output of clique
            else
            if newne < newce then extend version 2(new, newne, newce);
REMOVE FROM compsub:
            c : = c - 1;
ADD TO not:
```

```
            ne : = ne + 1;
            if nod > 1 then
            begin
SELECT A CANDIDATE DISCONNECTED TO THE FIXED POINT:
                s : = ne;
LOOK: FOR CANDIDATE:
                s : = s + 1;
                if connected [fixp, old[s]]then go to LOOK
            end selection
        end BACKTRACKCYCLE
        end extend version 2;
        for c : = 1 step 1 until N do ALL[c] : = c;
        c : = 0; extend version 2 (ALL, 0, N)
end output maximal complete subgraphs 2;
```

What is claimed is:

1. A method for detecting a violation of an email security policy of a computer system by transmission of selected email through said computer system, said computer system comprising a server and one or more clients having an email account, the method comprising:

(a) defining a model relating to prior transmission of email through said computer system derived from statistics relating to transmission behavior of prior emails transmitted through said computer system, wherein defining the model comprises grouping email addresses in said prior emails into one or more cliques based on the occurrence of said email addresses in common prior emails;

(b) gathering statistics relating to transmission behavior of a selected email through said computer system; and (c) classifying said selected email as being a member of a classification comprising violative of a security policy and non-violative of a security policy by applying said model to said statistics relating to said transmission behavior of said selected email through said computer system based on whether email addresses in said selected email are members of more than one said clique.

2. The method as recited in claim 1, wherein defining a model relating to prior transmission of email comprises defining a model relating to the transmission behavior of an attachment to said prior emails transmitted through said computer system.

3. The method as recited in claim 2, wherein said method further comprises extracting said attachments from each of said selected emails transmitted through said computer system.

4. The method as recited in claim 2, which further comprises identifying each said attachment with a unique identifier.

5. The method as recited in claim 4, wherein gathering statistics relating to said transmission behavior of selected email through said computer system comprises recording the number of occurrences of each said attachment received by said client.

6. The method as recited in claim 4, wherein gathering statistics relating to said transmission behavior of selected email through said computer system comprises, for each said attachment that is transmitted by an email account, recording a total number of addresses to which said attachment is transmitted.

7. The method as recited in claim 4, wherein gathering statistics relating to said transmission behavior of selected email through said computer system comprises, for each said attachment that is transmitted by an email account, recording a total number of email accounts which transmit said attachment.

8. The method as recited in claim 2, wherein defining a model comprises, for each attachment that is transmitted by an email account, defining a probabilistic model that classifies an attachment as violating an email security policy based on said total number of email addresses to which said attachment is transmitted and said total number of email accounts which transmit said attachment.

9. The method as recited in claim 1, wherein classifying said selected email is performed at said client.

10. The method as recited in claim 9, further comprising transmitting said classification to said server.

11. The method as recited in claim 1, wherein classifying said selected email is performed at said server.

12. The method as recited in claim 11, further comprising transmitting said classification to said one or more clients.

13. The method as recited in claim 1, wherein identifying said selected email with a unique identifier comprises substituting an email account user name with an alphanumeric code.

14. The method as recited in claim 1, wherein defining a model relating to transmission behavior of prior email comprises defining a model derived from statistics relating to transmission behavior of emails of one of said email accounts.

15. The method as recited in claim 14, wherein defining a model comprises defining a histogram of prior transmission of emails of one of said email accounts.

16. The method as recited in claim 15, wherein gathering statistics relating to said transmission behavior of selected email through said computer system further comprises defining a histogram of selected transmission of emails of one of said email accounts.

17. The method as recited in claim 16, wherein classifying said selected email as being a member of a classification comprises comparing said histogram of prior transmission of emails to said histogram of selected transmission of emails.

18. The method as recited in claim 17, where in comparing comprises performing a Mahalanobis distance analysis on said histogram of prior transmission of emails to said histogram of selected transmission of emails.

19. The method as recited in claim 17, wherein comparing comprises performing a Kolmogorov-Simironov test on said histogram of prior transmission of emails to said histogram of selected transmission of emails.

20. The method as recited in claim 17, wherein comparing comprises performing a Chi-square test on said histogram of prior transmission of emails to said histogram of selected transmission of emails.

21. The method as recited in claim 14, wherein defining a model relating to transmission behavior of emails from one of said email accounts comprises, for emails transmitted from said email account, defining said model based on the time in which said emails are transmitted by said email account.

22. The method as recited in claim 14, wherein defining a model relating to transmission of emails from one of said email accounts comprises defining said model based on the size of said emails that are transmitted by said email account.

23. The method as recited in claim 14, wherein defining a model relating to transmission of emails from one of said email accounts comprises defining said model based on the number of attachments that are transmitted by said email account.

24. The method as recited in claim 1, wherein said client comprises a plurality of email accounts and wherein defining a model relating to prior transmission of email comprises defining a model relating to statistics concerning emails transmitted by said plurality of email accounts.

25. The method as recited in claim 24, wherein defining a statistical model comprises defining a histogram of prior transmission of emails of a first one of said plurality of email accounts.

26. The method as recited in claim 25, wherein gathering statistics relating to said transmission of selected email through said computer system comprises defining a histogram of selected transmission of emails of a second one of said plurality of email accounts.

27. The method as recited in claim 26, wherein classifying said selected email as being a member of a classification comprises comparing said histogram of prior transmission of emails of said first one of said plurality of email accounts to said histogram of selected transmission of emails of said second one of said plurality of email accounts.

28. The method as recited in claim 27, wherein comparing comprises performing a Mahalanobis distance analysis on said histogram of prior transmission of emails of said first one of said plurality of email accounts to said histogram of selected transmission of emails of said second one of said plurality of email accounts.

29. The method as recited in claim 27, wherein comparing comprises performing a Kolmogorov-Simironov test on said histogram of prior transmission of emails of said first one of said plurality of email accounts to said histogram of selected transmission of emails of said second one of said plurality of email accounts.

30. The method as recited in claim 27, wherein comparing comprises performing a Chi-square test on said histogram of prior transmission of emails of said first one of said plurality of email accounts to said histogram of selected transmission of emails of said second one of said plurality of email accounts.

31. The method as recited in claim 24, wherein defining a model comprises defining a model based on the number of emails transmitted by each of said email accounts.

32. The method as recited in claim 24, wherein defining a model comprises defining a model based on the number of recipients in each email transmitted by each of said email accounts.

33. A method for detecting a violation of an email security policy of a computer system by transmission of selected email through said computer system, said computer system comprising a server and one or more clients having an email account, the method comprising:

(a) defining a model relating to transmission behavior of prior email transmitted by said email account derived from statistics relating to transmission behavior of prior emails transmitted by said email account, wherein defining the model comprises grouping email addresses in said prior emails into one or more cliques based on the occurrence of said email addresses in common prior emails;

(b) gathering statistics relating to transmission behavior of said selected emails transmitted by said email account;

(c) defining a model of said new email transmission behavior derived from said statistics; and (d) comparing said model of said new email transmission behavior and said model relating to prior email transmission behavior by said email account based on whether email addresses in said new email are members of more than one said clique.

34. The method as recited in claim 33, wherein defining a model relating to prior email comprises defining a model relating to statistics accumulated over a predetermined time period.

35. The method as recited in claim 33, wherein defining a model relating to prior email comprises defining a model relating the number of emails sent by said email account during a predetermined time period.

36. The method as recited in claim 33, wherein defining a model relating to prior email comprises defining a model relating to statistics accumulated irrespective of a time period.

37. The method as recited in claim 33, wherein defining a model relating to prior email comprises defining a model relating to the number of email recipients to which said email account transmits said emails.

38. The method as recited in claim 33, wherein defining a model relating to prior email comprises defining a model relating to the number of attachments in each email transmitted by said email account.

39. The method as recited in claim 33, wherein defining a model relating to prior email comprises defining said model based on said email addresses of recipients to which said emails are transmitted by said email account.

40. A system for detecting an occurrence of a violation of an email security policy of a computer system by transmission of selected email through said computer system comprising:
a client comprising:
(i) an email server configured to receive and transmit said selected email for one or more email accounts;
(ii) a client database configured to store information relating to said selected email and a model derived from statistics relating to transmission behavior of prior emails transmitted through said computer system; and
(iii) an analysis component configured to define a model for said selected email based on statistics relating to transmission behavior of said selected email, wherein the model is configured to group email addresses in said prior emails into one or more cliques based on the occurrence of said email addresses in common prior emails and compare said selected email model and said model derived from statistics relating to transmission behavior of said prior emails based on whether email addresses in said new email are members of more than one said clique;
(iv) a communications component configured to transmit statistics relating to the selected email to a server.

41. The system as recited in claim 40, wherein the client database is configured to store statistics relating to a sender email address of a respective email.

42. The system as recited in claim 40, wherein the client database is configured to store statistics relating to a recipient email address of a respective email.

43. The system as recited in claim 40, wherein the client database is configured to store statistics relating to a classification of an email as violative of the email security policy of the computer system.

44. The system as recited in claim 40, wherein the client database is configured to store statistics relating to prior email transmitted by said one or more email accounts.

45. The system as recited in claim 40, wherein the client database is configured to store statistics relating to prior email transmitted by said one or more email accounts in a histogram.

46. The system as recited in claim 40, wherein the analysis component is configured to compare a histogram relating to said selected email to said histogram relating to said prior email.

47. The system as recited in claim 40 wherein statistics relating to the transmission behavior of email comprises a rate of email transmission.

48. The system as recited in claim 40, wherein statistics relating to the transmission behavior of email comprises a number of email recipients to which an email account transmits an email.

49. The system as recited in claim 40, wherein statistics relating to the transmission behavior of email comprises a grouping of email addresses into cliques corresponding to email addresses of recipients occurring a respective email transmitted by an email account.

50. The system as recited in claim 40, wherein statistics relating to the transmission behavior of email comprises a time of day in which an email is transmitted.

51. The system as recited in claim 40, wherein statistics relating to the transmission behavior of email comprises a size of an email.

52. The system as recited in claim 40, wherein statistics relating to the transmission behavior of email comprises a number of attachments to an email.

53. The system as recited in claim 40, wherein statistics relating to the transmission behavior of email comprises a prevalence of an attachment.

54. The system as recited in claim 40, wherein statistics relating to the transmission behavior of email comprises a birth rate of an attachment.

* * * * *